Figures 1, 2, 3:
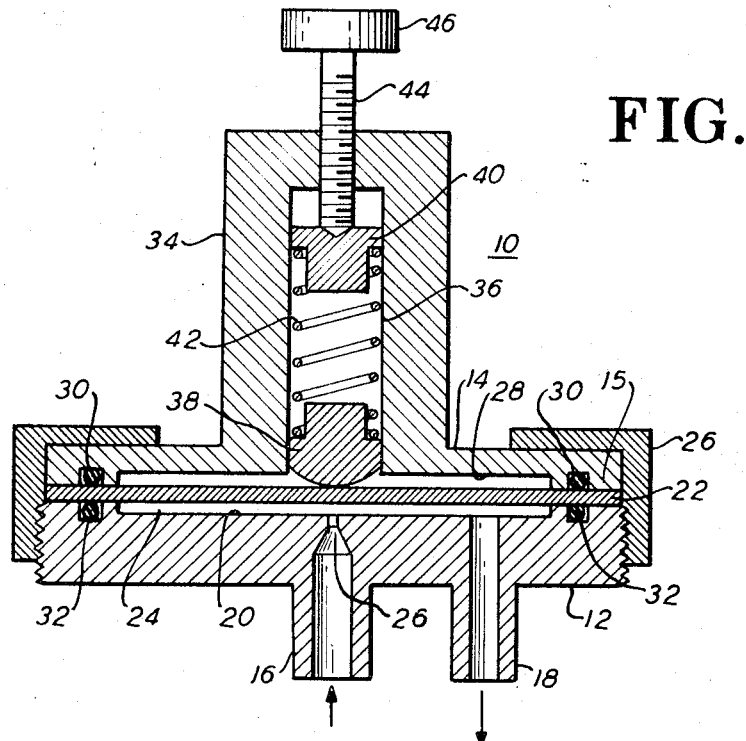

United States Patent
Sielaff

[15] 3,642,026
[45] Feb. 15, 1972

[54] METERING VALVE

[72] Inventor: Ulrich Sielaff, Mc Farland, Wis.

[73] Assignee: Air Reduction Company, Incorporated, New York, N.Y.

[22] Filed: Apr. 8, 1970

[21] Appl. No.: 26,545

[52] U.S. Cl. ................................................ 137/525, 138/46
[51] Int. Cl. ....................................................... F16k 7/12
[58] Field of Search .............. 137/510, 525, 525.1; 251/331; 138/44, 45, 46

[56] References Cited

UNITED STATES PATENTS

| 3,405,907 | 10/1968 | Kayser | 251/331 |
| 2,585,575 | 2/1952 | Nedergaard | 137/510 |
| 2,729,225 | 1/1956 | Safford | 137/510 |
| 3,053,315 | 9/1962 | Deady | 137/510 |
| 2,943,643 | 7/1960 | Pinter | 137/525 |

*Primary Examiner*—Samuel B. Rothberg
*Assistant Examiner*—William H. Wright
*Attorney*—Roger M. Rathbun, Edmund W. Bopp and H. Hume Mathews

[57] ABSTRACT

A metering valve having a high degree of resolution having a resilient disc which is movable toward and away from an orifice which conducts a fluid into a flow chamber, wherein an adjustable spring means is provided to vary the force for moving the resilient disc.

3 Claims, 6 Drawing Figures

INVENTOR.
ULRICH SIELAFF

BY
ATTORNEY

INVENTOR.
ULRICH SIELAFF

BY
ATTORNEY 3,642,026

METERING VALVE

BACKGROUND OF THE INVENTION

The present invention relates to a fluid-regulating device and more particularly to fluid flow control device having a high degree of resolution and stability.

The flow control device of the present invention is suitable for applications where currently needle valves are utilized and which, therefore, require certain precision of control.

In a great number of applications of the present needle valves, the overall fluid control requires a valve having a good stability of operation, and which has a high resolution characteristics, that is, extremely accurate and minute changes in flow may be effected by a relatively large movement of the operating member. Also, great precision of operation is normally desired such that a specified movement of a valve control member achieves an accurate change in the flow rate of the controlled fluid.

The standard needle valves in use are, for the most part, widely used for precise control applications; however, they are relatively expensive to produce, in that very precise machining of the components is necessary in order to produce a needle valve having excellent control characteristics.

In the present needle valves, the flow rate is controlled by the rotation of a conically shaped control member which moves laterally with respect to its seat, and the controlled fluid flows between the two members. Unless highly accurate machining of these two mating parts is performed, a slight rotation of the control member may cause an out-of-round portion of that member to align opposite a similar irregularity of the seat surface and the flow between the two members may be varied out of proportion to the degree of rotational movement. Therefore, the resulting new flow rate may not be in accord with the predetermined movement of the control member, thereby achieving an unpredictable increase or decrease in flow.

BRIEF SUMMARY OF THE INVENTION

In accordance with the present invention a fluid control device has been provided having an extremely high resolution of control, and which is capable of affording very accurate flow control.

In addition, the valve of the present invention does not require the highly expensive accurate machining of individual components heretofore necessary in needle valves.

Still further, the metering device of this invention may be accurately, yet simply designed for a wide range of fluid flows and also for different resolution of control in order to be adaptable for a variety of applications.

The improved fluid flow metering valve is illustrated in the accompanying drawings which show different forms of the valve embodying the invention, all of which incorporate the features and advantages described.

IN THE DRAWINGS

Figure 4:
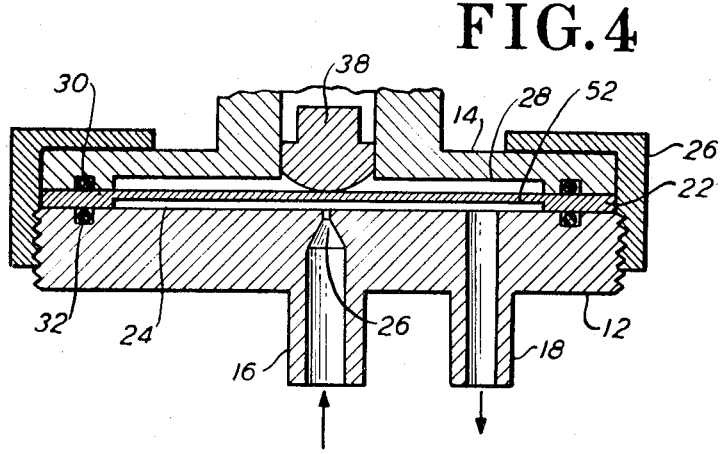
Figure 5:
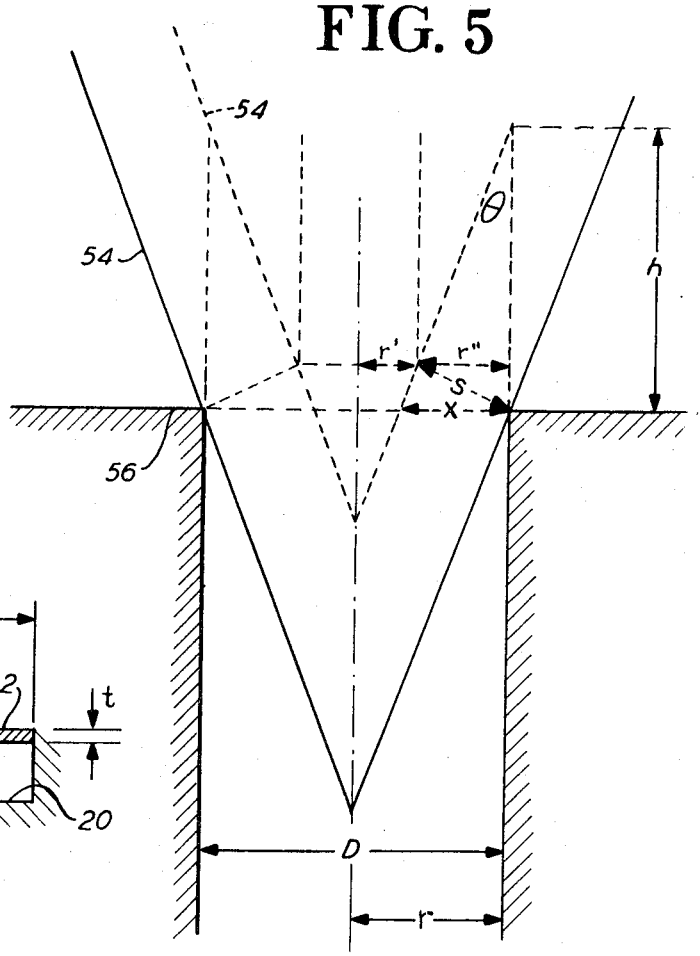
Figure 6:
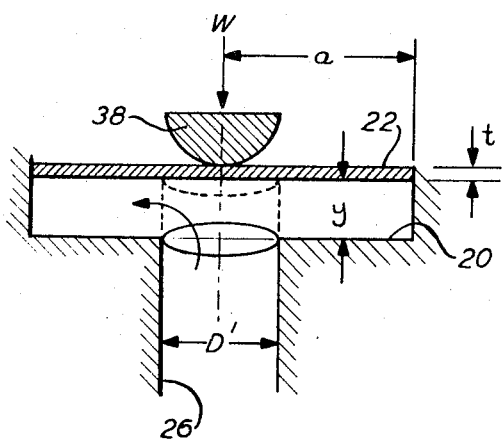

FIG. 1 is a vertical cross-sectional view showing a metering valve constructed in accordance with the present invention;

FIG. 2 is an enlarged vertical cross-sectional view of the metering orifice used in the invention, FIG. 3 is a vertical cross-sectional view of an alternate embodiment of the invention, FIG. 4 is a vertical cross-sectional view of a further alternate embodiment of the invention, FIG. 5 is a schematic view of a conventional needle valve; and FIG. 6 is a schematic view of the valve of the present invention, Referring particularly to FIGS. 1 and 2, there is shown a metering valve 10 comprising a baseplate 12; there is provided an inlet means 16 and an outlet means 18. A depression 20 is formed in the upper surface of the baseplate 12, such depression preferably being of circular configuration and having a predetermined depth. A relatively thick resilient disc 22 overlies the depression 20 and has its periphery abutting the upper surface of base plate 12, thereby creating a flow chamber 24 between the disc 22 and the depressed upper surface of baseplate 22.

The inlet means 16 communicates with the flow chamber 24 and is located at or near the geometric center of the depression 20. An orifice 26 of predetermined dimensions is provided within the inlet means 16 at the point of communication with flow chamber 24.

The outlet means 18 also communicates with flow chamber 24 and is located displaced from the inlet means 16 along the depressed surface 20.

The disc 22 is retained in position overlying the depression 20 by the valve body 14 which forcefully abuts the periphery of disc 22 through an annular flange 15 generally the same dimensions and oppositely positioned over the baseplate upper surface. The valve body 14 is retained in place by ring retainer 26 which threadedly engages base plate 12 and may be tightened to exert sufficient pressure for securely holding disc 22 between the valve body 14 and the base plate 12.

A depression 28 is formed in the valve body 14 and is geometrically similar to the baseplate depression 20, and when the valve 10 is assembled as shown, valve body depression 28 is aligned generally opposite the baseplate depression 20.

Suitable seals may be provided to prevent leakage of fluid along the engagement between the disc 22 and valve body 14 and baseplate 12, and as shown, such seals may conveniently comprise, respectively, O-rings 30 and 32. Such seals have, however, been found uncessary by providing a fluidtight pressed contact between the disc 22 and the valve body 14 and baseplate 12.

Valve body 14 includes a central upstanding portion 34 within which is formed a guide bore 36.

Slidingly retained within guide bore 36 are contact ball 38 and spring retainer 40. A spring 42 having a predetermined spring constant separates contact ball 38 and the spring retainer causing the contact ball 38 to engage against disc 22, the point of such engagement being substantially opposite orifice 26 in the inlet means 16.

Control of the pressure exerted by the contact ball 38 against disc 22 is provided through a control shaft 44 which is threadedly engaged with the closed end of the upstanding portion 34. The lower end of the control shaft 44 bears against the spring retainer 40 while the external or upper end has a knob 46 for ease of manual activation.

By a rotation of the knob 46, therefore, the control shaft 44 is caused to displace the spring retainer 40 within upstanding portion 34, thus exerting more or less pressure against the disc 22 via spring 42 and ball 38.

In the operation of the metering valve 10, a fluid is introduced through inlet means 16 and enters the flow chamber 24 by means of the orifice 26. As the flow leaves orifice 26, it is metered by an orifice formed between the disc 22 and the baseplate 12, which is adjustable by varying the distance between the disc 22 and the top of orifice 26. In FIG. 2, this distance is shown as $y$, and the specific value of $y$ determines the flow through orifice 26 into the flow chamber. The fluid is allowed to exit from flow chamber 24 through the outlet means 18.

The distance $y$ may be varied by increasing or decreasing the force exerted by the contact ball 38 acting on the disc 22 opposite orifice 26. The amount of force exerted by the ball is, in turn, controlled by the linear travel of control shaft 44 bearing against spring retainer 40 and thereafter acting through spring 42 upon contact ball 38.

A further embodiment of this invention is shown in FIG. 3 wherein relief holes 48 are provided in disc 22 in order to prevent the buildup of pressure within the flow chamber 24 and therefore equalizes the pressures acting upon both sides of the disc 22. The operation and stability of the disc 22 is therefore unaffected by an increase or decrease in pressure on any one side of disc 22. In order to prevent leakage from the valve 10 of fluid which enters portions of the valve above the disc 22; an O-ring 50 is included and may be located, as shown on the control shaft extension 45, thereby eliminating the possibility of leakage to the exterior of upstanding portion 34.

A further modification is shown in FIG. 4 where disc 22 has a depression 52 formed therein in order to form the flow chamber 24. In this embodiment, therefore, a depression is not necessary in the baseplate 12.

By a selection of various parameters in constructing the present metering valve, a design may be easily achieved having high resolution and excellent stability of operation.

As an example of the versatility of the design of the present metering valve, and its adaptability to the present application of needle valves, in FIG. 5, there is shown a schematic of a fine needle valve commonly in use.

The following is a sample calculation for the design of a disc valve in accordance with the present invention to relace a needle valve and having a higher degree of resolution.

Referring to FIG. 5, the solid line position of the needle 54 is shown in closed position against seat 56, while the dotted line position is shown with the valve partially opened. It is assumed that the needle 54 is directly coupled to a threaded stem, not shown, having N threads per inch and therefore the vertical distance $h$ which the valve moves through 1 turn is $1/N$ inches.

D is the internal diameter of seat 56, while $r$ is the internal radius of seat 56. The distance $s$ represents the width of a truncated conical orifice formed between the needle 54 and the valve seat 56 when the needle 54 has been retracted $h$ distance from a closed position. The distance $s$ is measured from the internal upper edge of seat 56 along a line meeting the surface of the needle 54 at a right angle. The distance $r'$ and $r''$, as shown are taken from the intersection point of $s$ and the needle surface, and extend therefrom parallel with the surface of seat 56, respectively, to the central axis of orifice 26 and the internal diameter of seat 56. The values of $r'$ and $r''$ are needed for calculating the effective area of the orifice area formed between needle 54 and seat 56. The angle of taper of the needle 54 is shown as $\theta$.

As shown, therefore, as the needle 54 is retracted one turn from the closed position, the area of the orifice is described by the equation:

(1) $A = \pi S (r = r')$:

where
$r = D/2$
$s = h \sin \theta$
since
$r'' = s \cos \theta$
$r'' = h \sin \theta \cos \theta$, and since
$r' = r - r''$; therefore
$r' = r - h \sin \theta \cos \theta$, or
$r' = D/2 - h \sin \theta \cos \theta$
By substituting into Equation (1) we have
$A = \pi h \sin \theta (D/2 + D/2 - h \sin \theta \cos \theta)$, and
(2) $A = \pi h \sin \theta (D - h \sin \theta \cos \theta)$
Assuming typical values for very fine commercial needle values;
$D = 1/16'', \theta = 2°$ and $N = 56$ threads/inch
therefore; $\sin \theta = 0.0349, \cos \theta = 0.9994,$
$h = 1'' = 0.0178''$ and $D = 0.0625''$
Substituting in Equation (2)
$A = 1.18 \times 10^{-4}$ in$^2$
Therefore the value of $1.18 \times 10^{-4}$ in$^2$ represents the change in orifice size when the needle 54 is retracted one complete turn to the dotted line position.

Taking this orifice area, FIG. 6 represents a schematic of the valve of the present invention slowing the basic parameters and where;

W is the load on disc 22; $y$ is the distance between the disc and the depression 20; and D' is the diameter of orifice 26.

To compare the adjustibility and resolution of this valve with the needle valve, we assume an orifice of the same area as that calculated for one turn of the needle valve, or $1.18 \times 10^{-4}$ in$^2$.

Typical values for a given disc valve and material for the disc are as follows:

| | |
|---|---|
| Bronze Disc: | $E = 15 \times 10^6$ p.s.i. |
| | $\nu = 0.15$ |
| | $m = 1/\nu$ |
| | $t = 0.010''$ thickness |
| Spring: | 7.2 lbs./in |
| | Adjustible 0.312'' (Total range) |
| | W — total load — (7.2) (0.312) = 2.24 lbs. |
| Threads: | 56 threads/in. |
| | Adjustible 0.312 in. |
| | Equivalent to about 17 turns total adjustment |

Using the orifice area from FIG. 5; the disc spacing $y$ may be determined by:

Orifice size, $A = \Pi D' y$ assume $D' = .032$ in.

then $y = \dfrac{A}{\Pi D'} = \dfrac{1.18 \times 10^{-4}}{\Pi (3.2 \times 10^{-2})} = .0012$ in.

Therefore the disc spacing $y$ is about 0.001 inches. To determine the radius of the disc, the deflection equation for a centrally loaded, fixed circular plate is used:

$$y = .001'' = \frac{3W(m^2-1)a^2}{4\Pi E m^2 t^3}$$

To solve for the radius (a)

$a = \sqrt{\dfrac{y 4 \Pi E m^2 t^3}{3W(m^2-1)}}$; substituting the assumed parameters, The diameter of the disc $= 0.338$ inches Therefore, it can be seen that by relatively simple calculations, a metering valve of the present invention, having a 0.338 diameter bronze disc, located 0.001 inches above an orifice of 0.032 inches diameter, and loaded with the above-described spring will close a $1.18 \times 10^{-4}$ inch orifice in 17 turns of the adjustment screw while a typical needle valve will close the same size orifice in only one turn. Thus an equivalent valve controlling this orifice will be 17 times more sensitive than a typical very fine commercial needle valve.

As it will be recognized, the present valve may easily be calculated for a wide range of adjustability and yet be precisely replaceable over needle values for the same or similar operation.

In addition, the spring loading upon the disc combines with the relatively rigid construction of the disc such that a change in inlet pressure has little or no effect on the ability of the valves to maintain a specific preset orifice size, and therefore the operation of the valve is very stable and yet has an extremely high resolution.

I claim:

1. A metering device comprising an inlet means and an outlet means, and having a flow chamber intermediate thereto, said inlet means having an orifice of a predetermined size for introducing a fluid into said flow chamber, and means for controlling the flow of fluid from said orifice comprising a resilient metallic disc having a known modulus of elasticity positioned a predetermined distance from said orifice, contact means adjacent said disc and adapted to exert a predetermined force at a point on said disc opposite said orifice to move said disc, adjustable spring means having a known spring constant adapted to be displaced linearly to vary the amount of force exerted by said contact means, the linear displacement of said spring means being large relative to the movement of said disc whereby said disc is caused to move with respect to said orifice to allow a greater or lesser flow of fluid from said orifice into said flow chamber.

2. A metering device as set forth in claim 1 wherein the ratio of the linear displacement of the spring means to the movement of said disc relative to said orifice is at least 300 to one.

3. A metering device as set forth in claim 1 wherein said metallic disc is bronze.

* * * * *

UNITED STATES PATENT OFFICE
CERTIFICATE OF CORRECTION

Patent No. 3,642,026      Dated February 15, 1972

Inventor(s) Ulrich Sielaff

It is certified that error appears in the above-identified patent and that said Letters Patent are hereby corrected as shown below:

Column 3, line 44, "$(r = r')$" should read -- $(r + r')$ --; line 61, "$h = 1''$" should read -- $h = 1''/56$ --.

Signed and sealed this 28th day of November 1972.

(SEAL)
Attest:

EDWARD M. FLETCHER, JR.
Attesting Officer

ROBERT GOTTSCHALK
Commissioner of Patents